(No Model.)
T. W. SEARING.
TAG HOOK.
No. 263,601. Patented Aug. 29, 1882.
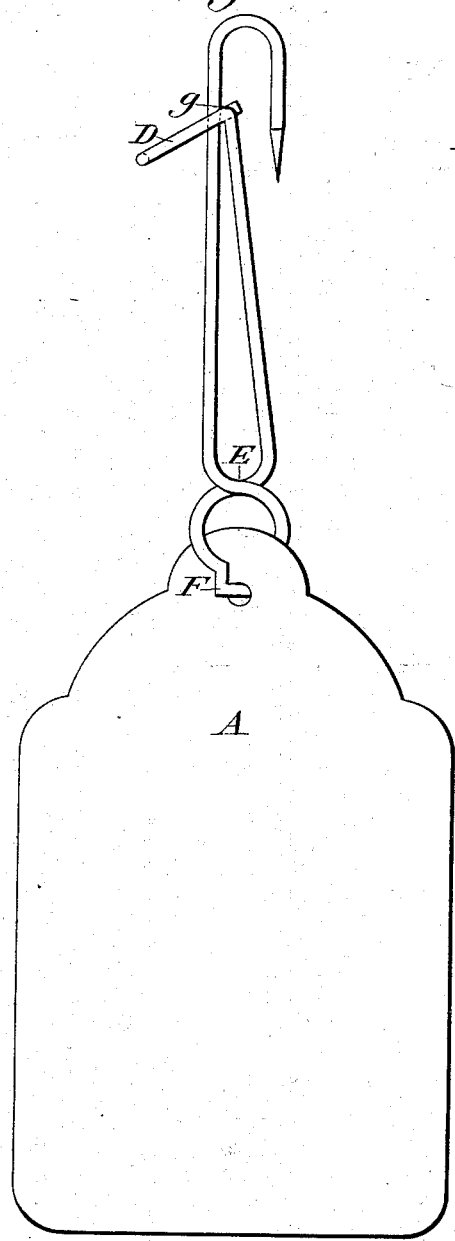
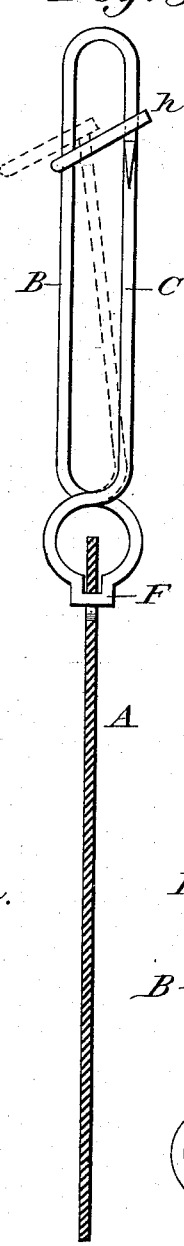
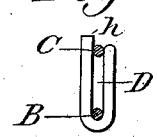
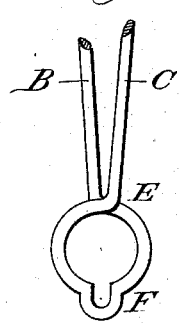
Witnesses:
John A. Ellis
J. F. Acker
Inventor:
Theodore W. Searing
By David A. Burr
Atty.

UNITED STATES PATENT OFFICE.

THEODORE W. SEARING, OF NEW YORK, N. Y.

TAG-HOOK.

SPECIFICATION forming part of Letters Patent No. 263,601, dated August 29, 1882.

Application filed September 24, 1881. (No model.)

*To all whom it may concern:*

Be it known that I, THEODORE W. SEARING, a citizen of the United States, residing at Harlem, in the city, county, and State of New York, have invented a new and useful Improvement in Tag-Hooks, of which the following is a specification.

My invention relates to hooks for securing tags to goods, and for other purposes.

The object of said invention is to furnish a hook which shall be self-locking, so that when it has become engaged it will of itself become securely fastened and positively remain so until released by pressure in the proper direction, and whose point shall be so guarded and protected as that it cannot accidentally catch into and damage either the goods to which it may be applied or other goods with which it may be brought into contact.

It consists in a novel construction of self-locking hook, produced by doubling a piece of spring-wire upon itself to form a small central ring or circular loop, from which the ends of the wire, after crossing each other to complete and close the ring, are made to project radially, and are bent at their outer ends, the one so as to double upon itself and form a hook, and the other at an angle with its length, so as to encircle the point and shank of the hook with a loop, which serves automatically, by reason of the elasticity of the wire, to guard and lock the point, the hook being readily sprung out therefrom for attachment or detachment by simply pressing the ends of the wire toward each other.

In the accompanying drawings, Figure 1 is a plan view of a tag, showing the hook in perspective unlocked; Fig. 2, a second perspective view of the same; Fig. 3, a section of the tag and side view of the hook locked. Fig. 4 illustrates the locking and point-shielding loop, and Fig. 5 is a view illustrating a modification of the invention.

In said drawings, B C F is a piece or length of spring-wire formed centrally into a ring or circular loop, F. The two ends of the circular loop, after crossing each other, so as to complete the ring, (see Fig. 2,) are bent just beyond their intersection to extend out radially therefrom in two arms or shanks, B C, which the elasticity of the ring operates to spread and keep apart from each other, as shown in Fig. 1. The outer extremity of the one arm, B, of the wire is doubled upon itself to form a hook, with its point next to the arm C, and the end of the arm C is bent out at an angle with its length toward the hook on B, so as to lap its point on one side, and, passing around its shank, return upon itself to terminate just past the point on the other side of it, forming thereby an open loop, D, (see Fig. 4,) within which the hook is automatically carried and retained by the elasticity of the ring F. The ring may be formed with a central offset, (see Fig. 2,) serving to increase its resiliency, and also to keep the tag or other object suspended therefrom in a central position. The end of the hook may be formed into a sharp point to facilitate passing the same into the fabric to which the tag is to be applied.

In attaching and detaching the hook from a fabric, the eye of the hook or lower portion of its arm B being held by the fingers, the index-finger is placed upon the extreme top of B, and as the end of the loop C is made to bear against the fabric it will be forced back from the hook, as in Fig. 1, leaving its point exposed. The index-finger may then be brought into play to force the point into the fabric. So soon as released from pressure the arm C will spring back to its normal position, as in Fig. 3, locking and shielding the point, so that it cannot catch in other goods. To detach the hook the arms B and C must be sprung together so as to expose the point, as in Fig. 1, and it may then be unhooked by moving it upward.

This automatic hook may be utilized as a snap-hook in various ways to loop and support parts of clothing in men and women's wear; also for attaching thereto light articles, such as porte-monnaies, fans, spectacles, cards, programmes, order of dancing, &c.

What I claim as new, and desire to secure by Letters Patent, is—

A snap-hook constructed of a single length of wire, formed at the middle into a ring or circular loop, and whose free ends, intersecting to close the ring and projecting thence radially, are made to terminate, the one in a hook and the other in a loop adapted to embrace the hook and guard its point, the hooked end being automatically carried into the guard-loop by the elasticity of the central ring, substantially in the manner and for the purpose herein set forth.

THEODORE W. SEARING.

Witnesses:
WM. D. LEONARD,
CHANDLER SMITH.